Oct. 31, 1933.   T. WARDLEY ET AL   1,933,529
METHOD OF SURFACE TREATING GLASSWARE
Filed May 19, 1932   2 Sheets-Sheet 1

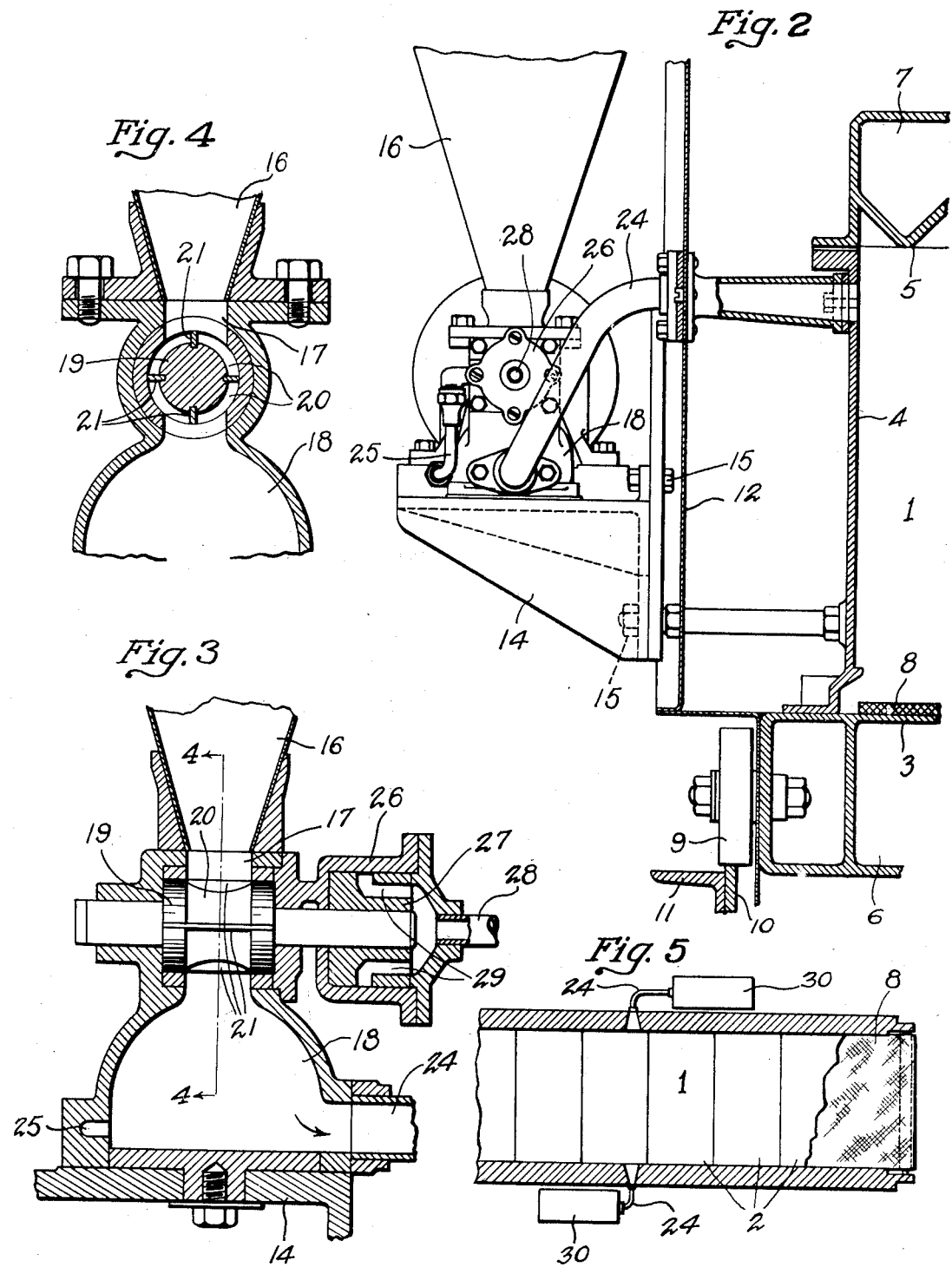

Patented Oct. 31, 1933

1,933,529

UNITED STATES PATENT OFFICE 1,933,529

METHOD OF SURFACE TREATING GLASSWARE

Thomas Wardley, Greenford, and John Blackburn Murgatroyd, West Ealing, England, assignors to Hartford-Empire Company, Hartford, Conn., a corporation of Delaware Application May 19, 1932, Serial No. 612,260, and in Great Britain June 4, 1931

5 Claims. (Cl. 49—89)

This invention relates to a method of and apparatus for surface treating glassware, which may have been shaped in a forming machine, or by hand, and is afterwards passed through an annealing leer, preferably of the kind disclosed in British Patent No. 250,201, which is a continuous muffle tunnel type glassware annealing leer having provision for controlling the temperature gradient throughout substantially the entire length of the tunnel.

In our experiments we have discovered that glassware can be given a superior strength and its appearance can be improved by subjecting it subsequent to its formation to the action of certain treating materials, preferably while it is being annealed. Two of the materials which we have found satisfactory in practice are elemental sulphur and lead borate, the sulphur being in our opinion preferable and producing superior results. These materials are, according to our present intention, introduced into the hotter portion of the glassware annealing leer in suspension in a current of gaseous medium, so that the surface of the ware may be exposed to the material itself or to such products of the material as may result from its introduction in the manner designated into the hot region in proximity to the glassware. When using sulphur, for example, these products probably include a mixture of sulphur dioxide and sublimed sulphur or may consist wholly of either one of these products.

The use of elemental sulphur in a glassware annealing leer considered broadly is not per se a part of this invention, but forms the subject matter of a copending application for patent in the United States of Mr. John B. Murgatroyd, one of the present co-inventors, this application being identified as Serial No. 517,662, filed Feb. 24, 1931 and entitled "Strengthening glassware by surface treatment."

We have developed a theory to account for the unusual and novel results which we have obtained, which theory we believe at this time to be true, but which is not absolutely relied upon by us as being correct. We desire to cover the method and apparatus developed by us for producing results as and similar to those which we have attained, whether or not our theory, which will be presently set forth, is entirely correct.

According to this theory, the surface of glass articles enering the leer contains very minute discontinuities or flaws, which considerably reduce the strength of the glass and which if their corners be "rounded off" or "filled in" will have a reduced detrimental effect upon the strength of the ware, particularly as to its resistance to thermal or mechanical shocks or strains. We believe that the method which we employ effects both mechanical and chemical actions in that the gaseous products of the material which we prefer to use affects the surface of the ware in its chemical composition and/or that our process effects a filling in of the interstices of the surface or fusing down of the sharp corners of the discontinuities or flaws on the surface in such a manner as to convert them to a less harmful shape and one which is less detrimental by reducing surface stresses concentrated in proximity to the discontinuities or flaws when the glassware is subjected to physical or thermal stresses.

Whether or not this theory is correct as to the reason for the improved results, we do know that ware treated according to our method actually is stronger than ware not so treated, and we have invented a novel method and certain novel apparatus usable in carrying out this method to both of which the present application is directed.

Among the objects of the present invention are to provide a novel method of introducing a pulverulent glass surface treating material, such as sulphur, into a leer, preferably in uniform measured quantities.

A further and more specific object of the invention is to provide a method of introduction of the glass surface treating material into a leer in an intermittent fashion and in uniform increments, as above set forth.

Other and more specific objects of our invention will become apparent from a reading of the following specification and appended claims when considered in connection with the accompanying drawings in which:

Fig. 2 is a fragmentary vertical section of a portion of the leer of Fig. 1 showing our novel apparatus in end elevation;

Fig. 3 is a fragmentary vertical section taken through the device for feeding the glass surface treating material from a container of the same and through the air valve therefor;

Fig. 4 is a fragmentary vertical section taken substantially on the line 4—4 in Fig. 3;

Fig. 5 is a fragmentary view in horizontal section as to the leer and showing how two powder introducing devices, constructed according to our invention may be arranged to cooperate with a single leer.

Figure 1:
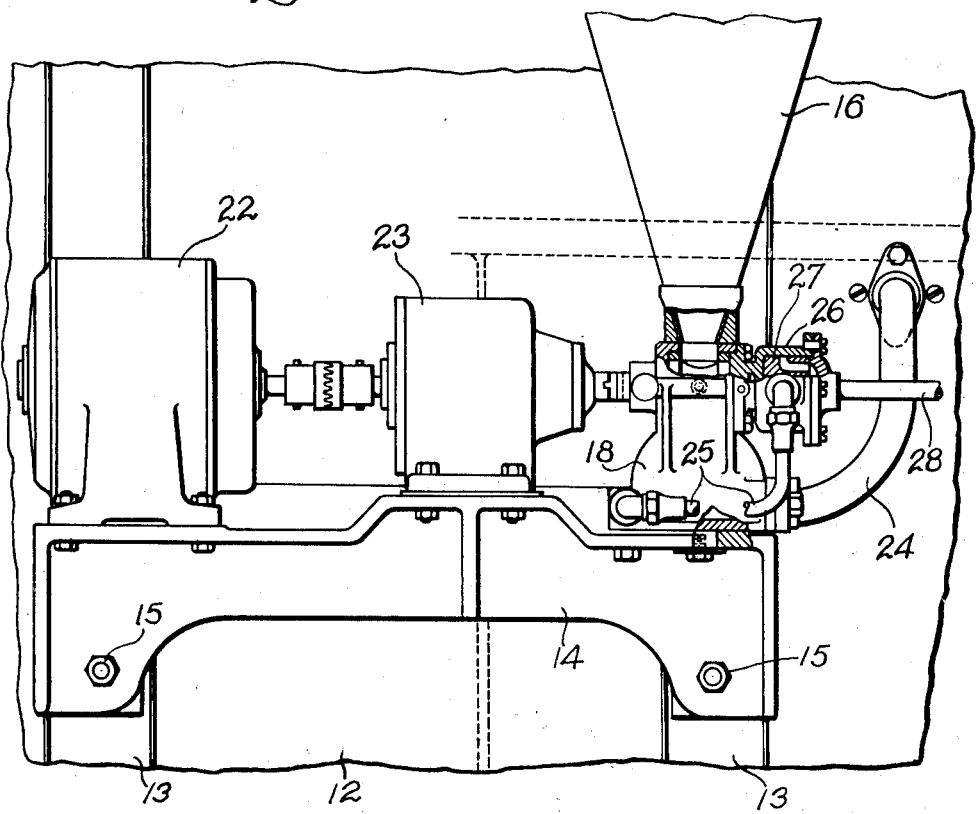
Figure 1 is a fragmentary side elevation of a portion of a glass annealing leer to which is affixed our novel apparatus for introducing pulverulent glass surface treating material, certain portions of this apparatus being broken away and shown in vertical section.

The leer illustrated in part in the accompanying drawings is preferably constructed according to British Patent 250,201 and comprises a leer tunnel 1, built up of a plurality of independent and similar sections 2 (see Fig. 5), which may be of cast iron and which are suitably secured together, so that in their entirety they form the tunnel. This tunnel as thus formed comprises a bottom wall 3, side walls as shown at 4, Fig. 2, and a top wall 5, the latter preferably being formed with an irregular contour as illustrated. Means are provided for supplying heat to the leer and/or controlling the temperature gradient in the tunnel 1, in the present instance there is illustrated the flue 6 below the leer and the flue 7 above the leer. It is to be understood, however, that in the hotter portions of the leer, the space indicated by the reference numeral 7 in Figs. 2 and 6 may be filled with heat insulating material in instances in which it is not desired to pass a temperature controlling media through this space. Ware is conveyed through the leer upon an endless apron or conveyor belt 8 which may be driven by any suitable means, such as those illustrated in the Patent 250,201 above referred to (these means not being shown in the accompanying drawings). The leer tunnel is preferably mounted upon wheels 9, which are adapted to rest and roll upon rails 10 supported by channels 11, the channels 11 and the rails 10 being supported in any suitable or desired manner, and the leer tunnel preferably being anchored only at its hotter or ware-entering end and being permitted to expand from this end by the wheels 9 rolling upon the rails 10. Spaced from the side walls 4 and preferably also from the top wall 5 is an outer casing, here generally indicated at 12, which is supported in any suitable manner upon a relatively rigid supporting structure secured to the inner tunnel sections and which may be built up of structural metal members, as indicated at 13 in Fig. 1. The leer structure thus far described is substantially that of the British Patent 250,201, above referred to, and forms no part of our present invention except insofar as the device of our invention may be applied thereto.

The apparatus which particularly forms the subject matter of our present invention is shown as mounted upon a bracket 14, suitably secured as by bolts 15 to the frame work 13 of the outer casing 12 of the leer. In the example of this invention illustrated in the drawings, a hopper or receptacle 16 contains the sulphur (or other glass surface treating material) in powder or similar form, and below the hopper outlet 17 is a measuring member, which in the example shown is rotatable in a casing or housing forming part of and disposed above a mixing chamber or receptacle 18. On and around the said measuring member 19 are provided a series of pockets which constitute measures 20, each of which is adapted to receive and contain a predetermined or measured quantity of the glass surface treating material supplied through the hopper outlet 17. The measures are formed by providing an annular groove around the member 19 and dividing it by transverse blades or strips 21 which are suitably retained in slits in the said member 19, thus providing a series of separate receptacles or pockets which as aforesaid constitute the measures 20. The measuring member 19 is rotated, for example, by an electric motor 22 through a reduction gearing 23, and during this rotation each measure 20 receives a definite quantity of the glass surface treating powder, which is carried around in the measure and eventually discharged therefrom into the chamber or receptacle 18.

The chamber or receptacle 18 is in communication with the interior of the leer tunnel 1, through a pipe or conduit 24 that is preferably flared at its discharging end and which as shown in the drawings is located at the side of the leer and debouches into the hotter region thereof.

The said chamber or receptacle 18 is also in communication by means of a pipe or passage 25 with a casing 26 containing a rotary valve or plug 27, the said casing being in communication with a source of compressed gaseous medium, such as air, through the pipe 28. The pipe 27 is preferably mounted on the same spindle as the rotating member 19, so as to be rotatable with the latter and so that the air may be admitted in synchronized timed relation with the admission of the pulverulent material from the hopper 16. The arrangement thus is such that when one of the measures 20 discharges its measured quantity of the glass surface treating powder into the chamber 18, the valve 27 assumes a position in which the pipe 25 is placed in communication with the pipe 28 through one of the passages 29 so that compressed air passed into the chamber 18 and blows the measured quantity of the glass surface treating powder through the pipe or conduit 24 into the leer. The position of the pipe or conduit 24 is preferably such that the powder is directed across the leer above the ware which is being carried through the leer tunnel 1 on the conveyor 8.

When sulphur is used, the sulphur powder is probably converted almost immediately partially into sulphur dioxide and partially also into sublimed sulphur as a result of the temperature condition within the leer, so that the surface of the glassware is acted upon by these gases with the results hereinbefore specified.

After the pulverulent glass surface treating material has been blown from the chamber 18, the rotation of the measuring member 19 and the valve or block 27 causes the latter to assume a position which closes communication between the pipe 28 and the chamber 18 until the next measured quantity of sulphur is discharged into the said chamber. If there should be any tendency for a part of the powder to remain in the discharging receptacle 20, the air rushing into the chamber or receptacle 18 will displace the powder from the measure and thus insure that the whole of the measured quantity is introduced into the leer.

The blades or strips 21 between the measures 20 engage with the interior surface of the housing or casing around the member 19, thus preventing the air from reaching the upper part of the member 19 where the measures 20 receive the pulverulent material from the hopper 16 through the outlet 17. By means of this construction the sulphur powder is sprayed or injected into the leer in measured quantities at predetermined intervals so as to insure uniform action on or treatment of the glassware.

As illustrated in Fig. 5, the apparatus for spraying or introducing sulphur or other glass surface treating material into the leer tunnel, there indicated generally at 30, is preferably provided one at either side of the leer, and the discharging end of the pipes 24 may be conveniently located in the fourth section from the entry end of the leer tunnel. It is to be understood, however, that either of these induction devices 30 might be used on either one side or the other of the tunnel without departing from the spirit of our invention.

We also contemplate the possibility that the powder may be injected or otherwise introduced at the top or bottom, or both, of the leer tunnel with or without the introduction thereof as above set forth in a transverse direction.

Figure 6:
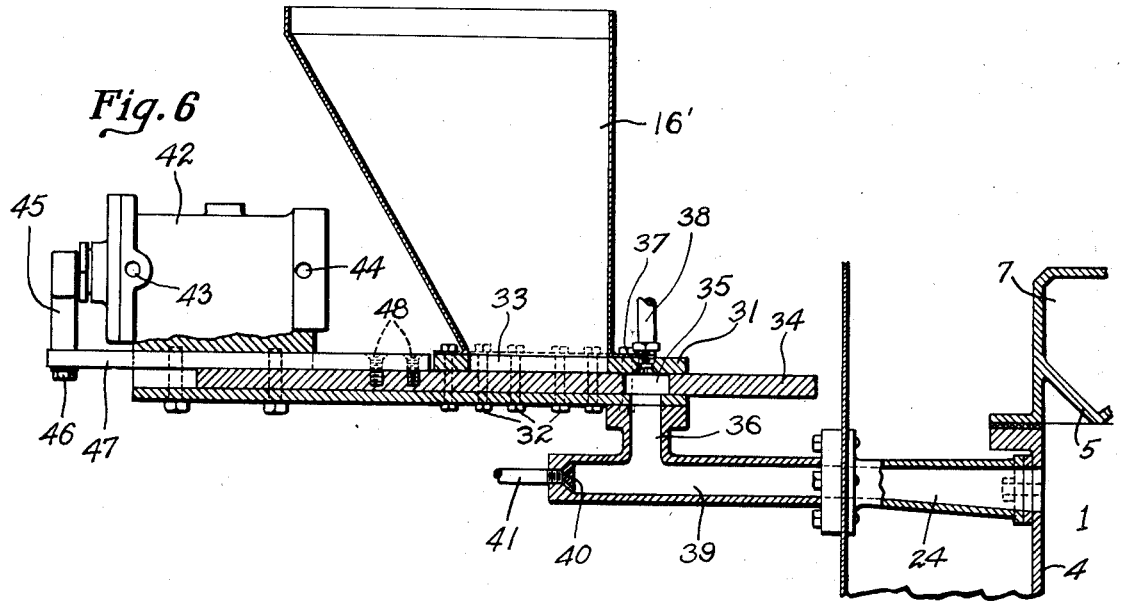
Fig. 6 is a view of another embodiment of our invention chiefly in vertical section and showing but a fragmentary portion of the leer.

Referring now to Fig. 6 wherein we have shown another form in which our invention may be embodied, there is illustrated a hopper or receptacle 16' having at its bottom portion a member 31 to which the hopper 16' is secured, as by bolts 32. The member 31 has an aperture 33 therein which is elongate when viewed from the top and which opens into the receptacle 16'. Beneath the member 31 a slide member 34 is adapted to operate in suitable guideways at the sides and bottom thereof, the member 34 being provided with an aperture 35 which may be moved between a position in registry with the opening 33 and the full line position shown in Fig. 6, where the opening 35 is in registry with a downwardly extending passage 36 and also with an air spray head 37, the latter being formed in the plate 31. To the spray head 37 there is connected a suitable source of compressed air through the pipe 38. Thus when the parts are in the position shown in Fig. 6, the admission of pressure air through the pipe 38 will be effective to force the pulverulent material out of the aperture 35 in the slide 34 and downwardly through the passage 36. The material thus forced downwardly will be moved into the horizontal passage 39 which corresponds generally to the chamber 18 shown in the previous figures. Communicating with one end of the passage 39 is another air spray head indicated at 40 to which is connected a fluid pressure (preferably compressed air) pipe 41. Admission of pressure through the pipes 38 and 41 may be controlled by a valve, such as shown at 26—27 in Figs. 1 and 3, or in any other suitable or desired manner.

Means may be provided for automatically reciprocating the slide 34 to move the aperture 35 therein between a position in vertical alignment with the aperture 33 and a position in vertical alignment with the spray head 37 and downwardly directed passage 36. This means as shown comprises a fluid pressure cylinder 42 to which pressure may be admitted through the ports 43 and 44 from any suitable means. The piston in the cylinder 42 is provided with a piston rod to the end of which is connected a laterally extending bracket 45 which is in turn connected at 46 to a member 47 secured to the slide 34 as by the screws 48.

The operation of this device is substantially the same as that above described, with the exception that a reciprocating motor is used instead of a rotating driving means, as in the preceding figures, for dispensing the powder from the receptacle into the mixing chamber and more positive means are used for insuring that the powder so abstracted from the receptacle is completely forced into the mixing chamber and thence into the leer.

While we have shown and described several embodiments of our invention, it will be understood that other embodiments may be made therein and certain features may be used with advantage in other relationships. We do not wish to be limited, therefore, except by the scope of the appended claims, which are to be construed as broadly as the state of the prior art permits.

We claim:

1. The method of treating the surface of glassware to increase the strength of such ware, which comprises injecting a pulverulent glass surface treating material in suspension in a gaseous medium into a relatively hot portion of an annealing leer through which the ware to be treated is being passed for annealing.

2. The method of surface treating glassware according to claim 1, characterized in that the pulverulent glass surface treating material is injected into the annealing leer transversely of the path of movement of the ware therethrough, and the gaseous medium in which said material is suspended is air.

3. The method of surface treating glassware according to claim 1, characterized in that the pulverulent glass surface treating material is introduced into the leer in measured quantities and at the expiration of predetermined timed intervals, and that the gaseous medium used for conveying said material into the leer is admitted at predetermined time intervals synchronized with the time interval of introduction of the measured quantities of said material.

4. The method of surface treating glassware according to claim 1, characterized in that the pulverulent glass surface treating material used is elemental sulphur.

5. The method of surface treating glassware according to claim 1, characterized in that the pulverulent glass surface treating material used is lead borate.

THOMAS WARDLEY.
JOHN BLACKBURN MURGATROYD.